Sept. 1, 1970     M. BRENNER ET AL     3,526,903

ADAPTIVE SERVO CONTROL SYSTEM FOR MACHINE TOOLS

Filed Aug. 12, 1968

INVENTOR
MIRON BRENNER
DOV TIROSH

United States Patent Office
3,526,903
Patented Sept. 1, 1970

3,526,903
ADAPTIVE SERVO CONTROL SYSTEM FOR MACHINE TOOLS
Miron Brenner, Rechov Hanapilim 61/9, Tel Gibborim, Holon, Israel, and Dov Tirosh, Rechov Shamgar 28, Tel Aviv, Israel
Filed Aug. 12, 1968, Ser. No. 751,849
Int. Cl. G05b *13/02*
U.S. Cl. 318—92                      7 Claims

ABSTRACT OF THE DISCLOSURE

A numerical control system for controlling a machine tool comprises a program unit, a displaceable transducer adapted to sense the surface of the workpiece, means displacing the transducer in the longitudinal and transverse directions in accordance with the program of the program unit and, a control unit connected to the transducer for controlling the feed of the tool holder in accordance with the actual position of the transducer and the sensed surface of the workpiece, the arrangement being such that the transducer cross-displacement, and preferably also its longitudinal displacement, is controlled directly and solely by the program unit, while the tool cross-feed, and preferably also its longitudinal feed, is controlled directly and solely by the transducer.

BACKGROUND OF THE INVENTION

Field of the invention

The present invention relates to a numerical control system for machine tools, and particularly to one including a program unit for controlling the working of a workpiece by the machine tool in accordance with the program of the program unit. Such systems are frequently used in point-to-point, straight-line and contouring operations on lathes, milling machines, grinders, and on other machine tools.

Description of the prior art

In the program control systems commonly used today, the program unit usually controls directly the machine tool or, in some cases, the workpiece. This usually requires, particularly for intricate working operations, a very complicated and costly control system and also a high degree of accuracy in the machine tools.

An object of the present invention is to provide a new program control system for machine tools which does not require the degree of accuracy in the machine tool, or the complexity in the program and the program control unit, heretofore needed for such systems.

SUMMARY OF THE PRESENT INVENTION

According to a broad aspect of the invention, there is provided a control system for controlling the working of a workpiece by a machine tool, comprising, a program unit, a displaceable transducer adapted to sense the surface of the workpiece, means displacing the transducer longitudinally and cross-wise in accordance with the program of the program unit, and a control unit connected to the transducer for controlling the feed of the tool holder in accordance with the actual position of the transducer and the sensed surface of the workpiece. The arrangement is such that the transducer cross-displacement (and preferably also its longitudinal displacement) is controlled directly and solely by the program unit, whereas the tool cross-feed (and preferably also its longitudinal feed) is controlled solely and directly by the transducer.

The novel system thus provides a self-adaptive control for the machine tools. That is to say, the transducer, which is displaced in accordance with the program, senses the actual surface of the workpiece as it is being processed and controls the working operation in accordance with what it senses. Accordingly, if the machine tool is not very accurate, the errors introduced into the workpiece while it is being worked by the tool will be sensed and corrected during the working operation. This arrangement also enables the use of a simpler control system. Further, the control system can be prepared and sold as a separate unit and incorporated into existing machines.

According to further features of the invention, the transducer is mounted on a table which is displaceable in two coordinates in accordance with the program of the program unit. In the preferred embodiment described below, the transducer is also rotatable about a vertical axis in accordance with the program of the program unit. In the preferred embodiment of the invention described below, the positioning means includes a servo-motor effective to move the tool holder until there is no variation between the actual position of the transducer and the sensed surface of the workpiece. The control unit includes a pair of presettable elements indicative of "plus" and "minus" tolerances, respectively, which actuate the servo-motor in one or the other directions as the tolerances are exceeded, as sensed by the transducer.

Many different types of transducers are known and may be used, for example electrical, optical e.g. photoelectric, lasers, or pneumatic. In the described embodiment, an electronic transducer is illustrated. It includes an oscillator driving a pair of balanced windings coupled by a movable core and the movable core sensing the surface of the workpiece.

Further features and advantages of the invention will be apparent from the description below.

BRIEF DESCRIPTION OF THE DRAWINGS

The invention is herein described with reference to the accompanying drawings which illustrate, somewhat diagrammatically and by way of example only, one preferred embodiment of the invention. In the drawings.

DESCRIPTION OF THE PREFFERRED EMBODIMENT

Figure 1:
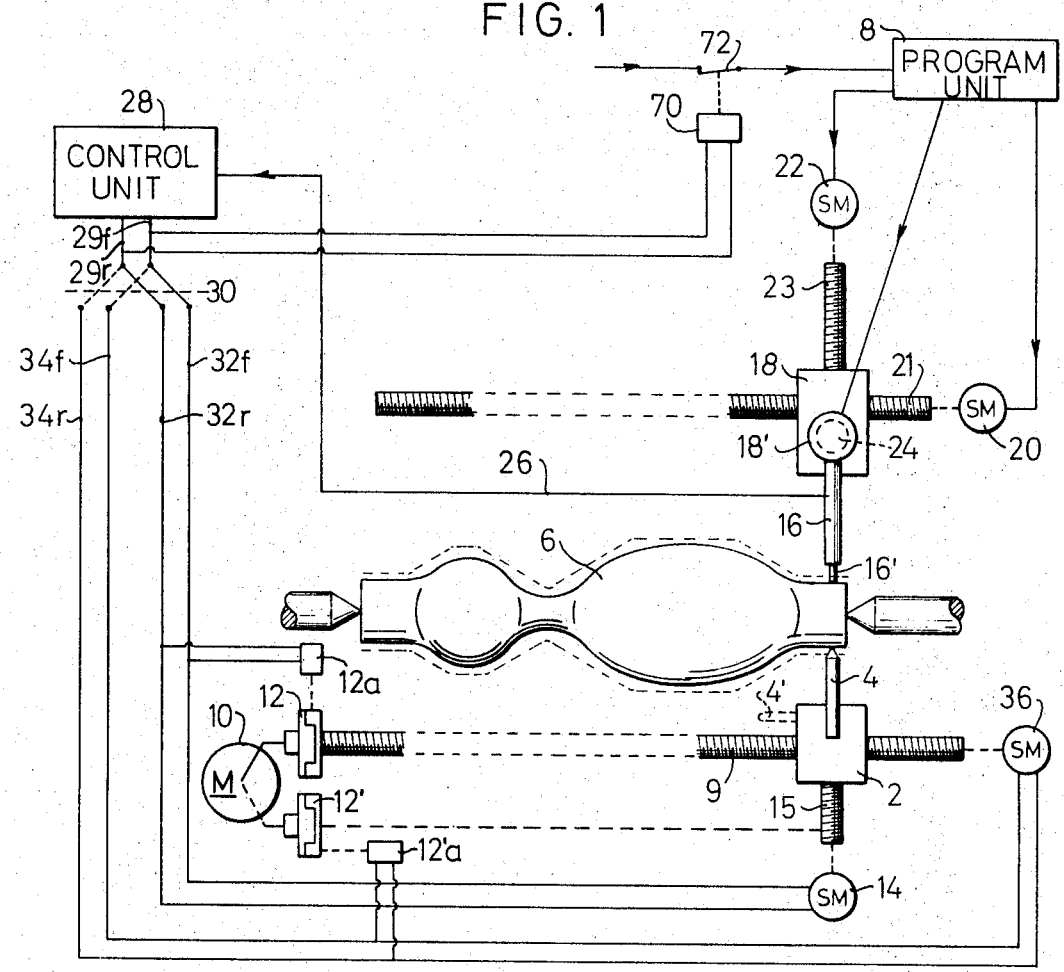
FIG. 1 is a diagrammatic top plan view illustrating a control system constructed in accordance with the invention for a lathe.

With reference to FIG. 1, there is shown a lathe including a carriage 2 carrying a displaceable cutting tool 4 adapted to machine workpiece 6 in accordance with the program contained in a program unit 8. During the machine operation, the cutting tool 4 is fed by tool longitudinal-feed means comprising lead screw 9, drive motor 10 and clutch 12 in the feed direction longitudinally of the workpiece 6. In the working direction transversely to the axis of the workpiece, the tool is fed by tool cross-feed means including servo-motor 14 driving lead screw 15. It will be appreciated that, in some applications, the tool longitudinal-feed means and cross-feed means could be connected to the workpiece, instead of the tool, for effecting the relative movements between the tool and the workpiece holder in the feed direction longitudinally of the workpiece, and the working direction transversely of the workpiece, respectively.

In the conventional program control system commonly used today, the program unit 8 directly controls the servo-motor 14. In the novel system of the present invention, however, the program unit 8 controls a displaceable transducer 16 which is located so as to sense the surface of the workpiece 6 as it is being machined by the tool, the transducer 16 in turn controlling the servo-motor 14 which positions the tool.

Transducer 16 is mounted on a table 18 which is longitudinally-displaceable by servo-motor 20 and lead screw 21 longitudinally of the workpiece, and cross-displaceable by servo-motor 22 and lead screw 23 transversely of the workpiece. A further servo-motor (shown in broken lines at 24) is provided for rotating about a vertical axis an intermediate table 18' carrying the transducer 16, the latter table being rotatably mounted on table 18. All the servo-motors 20, 22, and 24 are controlled by the program unit 8 so that the transducer is continuously displaced in accordance with the program in that unit.

Figure 2:
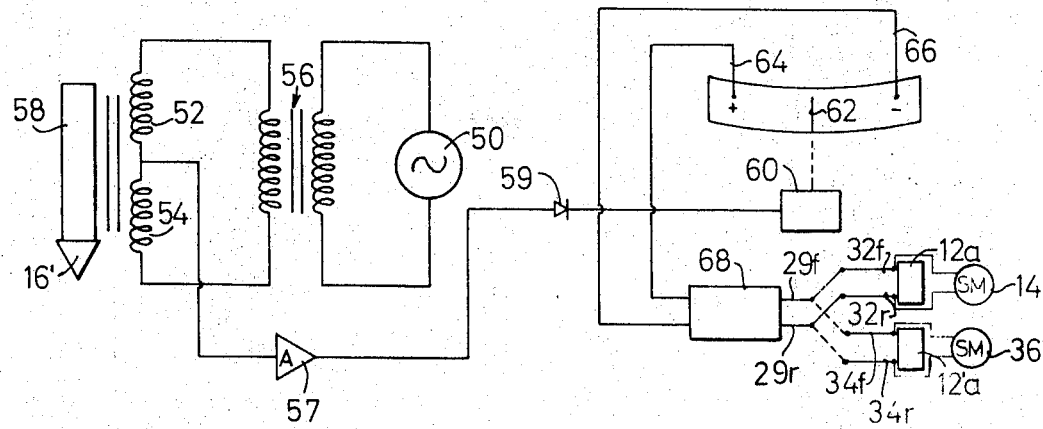
FIG. 2 is a schematic circuit diagram of a control unit that may be included in the system of FIG. 1.

The sensing element 16' of transducer 16 engages the surface of the workpiece and produces an output through line 26 to a control unit 28. The control unit in turn produces an output or control signal when there is a deviation between the actual position of the transducer (representative of the programmed profile of the workpiece) and the sensed surface of the workpiece (representative of its actual profile). One form of control unit that may be used is schematically illustrated in FIG. 2 and will be described below.

The output from control unit 28 appears on lines 29f and 29r and is applied through switch 30 either to conductors 32f and 32r or to conductors 34f and 34r. Conductors 32f and 32r are connected to drive servo-motor 14 in the forward and reverse direction, respectively, to control this positioning of the tool 4 transversely of the workpiece, as described below. In some cases, for example in facing operations, it may be desired to position the cutting tool parallel to the longitudinal axis of the workpiece (as shown in broken lines by tool 4' in FIG. 1) and then to control the position of the cutting tool so that it is moved longitudinally of the workpiece. For this purpose, a second servo-motor 36 is provided, and this latter servo-motor is connected to the control unit 28 by means of the conductors 34f and 34r so as to be actuated in the forward or reverse direction, respectively, in accordance with the output from control unit 28. Switch 30 is actuated to select the servo-motor to be controlled.

During the normal longitudinal operation, when servo-motor 14 is controlled for moving the cutting tool 4 transversely of the workpiece, motor 10 is operated through clutch 12 to drive lead screw 9. During a facing operation, when servo-motor 36 is operated, motor 10 operates through clutch 12' to drive lead screw 15 transversely of the workpiece.

As indicated earlier, there are many different types of transducers and control units which could be used. FIG. 2 schematically illustrates but one type. This type includes an oscillator 50 driving a pair of balanced windings 52 and 54, the latter being coupled to the oscillator by a transformer 56. The balanced windings 52 and 54 are coupled together by means of a movable core 58, the bottom surface of which serves as the sensing element and engages the workpiece 6. Displacement of the core 58 from zero causes an unbalance to occur between windings 52 and 54, producing an output which is amplified in amplifier 57 and rectified in rectifier 59 and then applied to an indicator drive 60 which drives an arm or needle 62. It will be seen that the amplitude and direction of displacement of core 58 from zero will thus be indicated by the amplitude and direction of displacement of needle 62.

The control unit further includes a pair of presettable elements, shown in the form of electrical contacts 64 and 66, which indicate "plus" and "minus" tolerances respectively. These elements may be preset in accordance with the tolerances desired, so that the servo-motor controlled will be actuated to move the cutting tool 4 only when the tolerance, as sensed by the sensing element 16', is exceeded in one or the other direction. When the tolerance is exceeded, a relay system schematically illustrated at 68 is actuated and its output is applied to conductors 29 for controlling the servo-motor 14 or 36 as described earlier.

In the illustrated embodiment, clutch 12 is disengaged whenever servo-motor 14 is actuated, and for this purpose there is shown a control member 12a (e.g., a solenoid) connected to conductors 32a and 32r effective to disengage clutch 12 wherever a signal appears on either of these two conductors for actuating servo-motor 14 in the forward or reverse direction, respectively. In a facing operation, clutch 12' is similarly disengaged by control member 12'a (the latter being connected to conductors 34f and 34r) whenever servo-motor 36 is actuated.

Further, control unit 28 includes a switching means effective to interrupt the displacement of the transducer by the program unit whenever either servo-motor 14 or 36 is actuated. For this purpose, there is schematically shown a switching unit 70 connected to output conductors 29 of control unit 28, which switching unit is effective to open switch 72 controlling the supply to program unit 8.

The operation of the system described will be apparent from the foregoing. At the start, the transducer 16 is set at zero, whereby the two windings 52 and 54 are balanced. Assuming the workpiece is oversize at the start of the cutting operation, the core 58 of the transducer is moved upwardly by the workpiece, unbalancing windings 52 and 54, and producing an output from the control unit. The servo-motor 14 is thus actuated to position the cutting tool, and clutch 12 is disengaged. When the cut surface of the workpiece has been reduced to proper size, this is sensed by core 58 of the transducer, which causes the windings 52 and 54 to become rebalanced, and the output from control unit 28 to terminate. Thus, servo-motor 14 ceases to operate, and clutch 12 is re-engaged. The program unit 8 now displaces the transducer 16 in accordance with the program, and the transducer senses the actual profile of the workpiece. As non-conformities between the actual and the programmed profile occur, the windings 52 and 54 are unbalanced by the core 58, creating an output which controls servo-motor 14 to correct the difference. The presettable elements 64 and 66 determine the tolerance above and below which the servo-motor 14 is actuated. The tool 4 is moved with each actuation of the servo-motor 14.

For facing operations, the tool 4 is mounted in the broken line position, and switch 30 is actuated to the broken lines position shown. Clutch 12' is connected to motor 10, the latter motor being used for continuously driving the tool transversely of the workpiece, and servo-motor 36 is used for effecting the controlled displacement thereof longitudinally of the workpiece in accordance with the program.

It will be seen that whenever an output is produced from control unit 28, clutch 12 is disengaged by clutch control member 12a (in a facing operation, clutch 12' is disengaged by clutch control member 12'a), so that motor drive 10 is disconnected whenever servo-motors 14 or 36 are operating. Also, whenever an output is produced from control unit 28, switching unit 60 is effective to open switch 72, and thereby to interrupt the displacement of transducer 16 by the program unit 8.

Many variations and applications of the invention will be apparent. For example, a plurality of transducers may be mounted on table 18', the latter being rotated to bring one of the transducers into working position, i.e. to sense the surface of the workpiece. In addition, drive motor 10, or its clutch 12, may be controlled by the program unit, directly or through the control unit, for special cases where the working operation, or a correction operation, calls for stopping the feeding, or changing the rate of feed, of the cutting tool. Further, table 18 may be mechanically coupled to carriage 2 so as to move together therewith longitudinally of the workpiece, the transverse displacement of the transducer being controlled by the program. Also, the servo-motors 14 and 36 could be operated simultaneously with motor 12, whereupon clutches 12 and 12' would be omitted. Motor 10 could also be omitted, the positioning of the tool holder (or in some cases the workpieces holder) being effected by the servo-motors alone.

The invention could also be embodied in more sophisticated control systems, for example using known transducers able to detect in two coordinates simultaneously, and also using known control units able to produce the required signals for the two coordinates from the transducer output. In addition, if closer accuracy is required, the system may be provided with a temperature sensing device which, if and when the temperature of the workpiece rises above predetermined limits, interrupts the machining, causes an increased flow of a coolant, and/or compensates for the workpiece dimensional change.

Many other changes, variations and applications of the illustrated embodiment may be made.

What we claim is:

1. A control system for controlling the working of a workpiece by a machine tool, comprising: a workpiece holder; a tool holder; tool longitudinal-feed means for effecting relative movement between the machine tool and the workpiece holder in the feed direction longitudinally of the workpiece; tool cross-feed means for effecting relative movement between the machine tool and the workpiece holder in the working direction transversely of the workpiece; a displaceable transducer sensing the surface of the work piece; transducer longitudinal-displacing means for displacing the transducer in the longitudinal direction with respect to the workpiece; transducer cross-displacing means for displacing the transducer in the transverse direction with respect to the workpiece; said transducer cross-displacing means being separate and distinct from said tool cross-feed means; a program unit coupled to and controlling said transducer cross-displacing means but uncoupled to said tool cross-feed means; and a control unit coupled to said transducer and controlling said tool cross-feed means, said transducer cross-displacing means being thereby controlled directly by the program unit, and said tool cross-feed means being controlled solely by said transducer.

2. A system as defined in claim 1, wherein said transducer longitudinal-displacing means is also separate and distinct from said tool longitudinal-feed means, said program unit being coupled to and controlling said transducer longitudinal-displacing means but being uncoupled to said tool longitudinal-feed means, said transducer longitudinal-displacing means being thereby controlled directly by the program unit, and the tool longitudinal-feed means being controlled solely by the transducer.

3. A system as defined in claim 1, wherein said transducer is also rotatable about a vertical axis and includes rotatable displacing means therefor controlled by said program unit.

4. A system as defined in claim 1, wherein said tool holder is mounted so that it may be pivoted to extend parallel to the longitudinal axis of the workpiece for facing operations, the system further including a second tool longitudinal-feed means controlled by said control unit, and switching means for connecting said latter means to said control unit during facing operations instead of said first-mentioned tool longitudinal-feed means.

5. A system as defined in claim 1, wherein said control unit includes a pair of presettable elements indicative of "plus" and "minus" tolerances which actuate said tool cross-feed means in the forward and reverse direction, respectively, as controlled by said transducer.

6. A system as defined in claim 1, wherein said tool longitudinal-feed means includes a clutch and means for disengaging same during operation of said tool cross-feed means.

7. A system as defined in claim 1, wherein said control unit includes switching means effective to interrupt the displacement of said transducer by the program unit during operation of said tool cross-feed means.

References Cited

UNITED STATES PATENTS

| | | | |
|---|---|---|---|
| 2,831,387 | 4/1958 | Ovshinsky | 318—29 X |
| 2,927,258 | 3/1960 | Lippel. | |

FOREIGN PATENTS 802,206 10/1958 Great Britain.

THOMAS E. LYNCH, Primary Examiner

U.S. Cl. X.R.

82—24; 90—13; 318—28